US012044191B2

(12) United States Patent
Eckroth

(10) Patent No.: US 12,044,191 B2
(45) Date of Patent: Jul. 23, 2024

(54) CYLINDER LINER FOR INTERNAL COMBUSTION ENGINE AND METHOD FOR INSTALLING THE SAME

(71) Applicant: Cummins Inc., Columbus, IN (US)

(72) Inventor: David J. Eckroth, Columbus, IN (US)

(73) Assignees: Cummins Inc., Columbus, IN (US); Achates Power, Inc., San Diego, CA (US)

( * ) Notice: Subject to any disclaimer, the term of this patent is extended or adjusted under 35 U.S.C. 154(b) by 0 days.

(21) Appl. No.: 18/364,001

(22) Filed: Aug. 2, 2023

(65) Prior Publication Data

US 2024/0159198 A1 May 16, 2024

Related U.S. Application Data

(60) Provisional application No. 63/373,365, filed on Aug. 24, 2022.

(51) Int. Cl.
*F02F 1/16* (2006.01)

(52) U.S. Cl.
CPC .................................... *F02F 1/16* (2013.01)

(58) Field of Classification Search
CPC ..................................... F02F 1/18; F02F 1/16
See application file for complete search history.

(56) References Cited

U.S. PATENT DOCUMENTS

| | | | | |
|---|---|---|---|---|
| 3,714,931 | A | 2/1973 | Neitz et al. | |
| 4,233,717 | A | 11/1980 | Noda et al. | |
| 5,419,037 | A | 5/1995 | Bailey | |
| 5,497,693 | A | 3/1996 | Ward | |
| 5,582,144 | A | 12/1996 | Mizuntani | |
| 8,468,694 | B2 | 6/2013 | Moss et al. | |
| 2009/0020107 | A1 * | 1/2009 | Ramella | F02B 75/34 123/65 R |

* cited by examiner

*Primary Examiner* — Jacob M Amick
*Assistant Examiner* — Charles J Brauch
(74) *Attorney, Agent, or Firm* — Taft, Stettinius & Hollister LLP

(57) ABSTRACT

An internal combustion engine with an engine block with at least one cylinder cavity housing a cylinder liner. The cylinder liner includes at least one aperture in a wall of the cylinder liner that is aligned with one of an intake port or an exhaust port in the engine block.

20 Claims, 11 Drawing Sheets

CYLINDER LINER FOR INTERNAL COMBUSTION ENGINE AND METHOD FOR INSTALLING THE SAME

GOVERNMENT RIGHTS

This invention was made with government support under Other Transaction Authority (OT) agreement number W56HZV-16-9-0001, awarded by the United States Army. The government has certain rights in the invention.

TECHNICAL FIELD

The present application relates to cylinder liners for internal combustion engines, and more particularly, but not exclusively to cylinder liners with at least one side wall aperture and a process for installing the same in an engine block.

BACKGROUND

Present approaches to cylinder liners suffer from a variety of drawbacks, limitations, disadvantages and problems including those associated with installation and ability to provide a desired performance after installation. For example, cylinder liners with side wall apertures that receive intake flows or provide an outlet for exhaust flows may not properly align with the respective intake ports or exhaust ports in the engine block. The lack of proper alignment may hinder intake flow into the cylinder or exhaust flow out of the cylinder, or cause sealing issues between the cylinder liner and engine block. Thus, there is a continuing demand for further contributions in this area of technology.

SUMMARY

One embodiment of the present application includes an internal combustion engine with a block having a cylinder cavity that extends axially along a longitudinal axis and at least one port opening into the cylinder cavity. A cylinder liner extends axially along the cylinder cavity and in contact with the engine block. The cylinder liner includes a wall and at least one aperture through the wall. The at least one aperture extends between an inner surface of the wall and an outer surface of the wall. At the inner surface of the wall, the at least one aperture is aligned with a projected opening of the at least one port. At the outer surface of the wall, the at least one aperture is offset outwardly from the opening of the at least one port into the cylinder cavity.

Another embodiment of the present application includes a cylinder liner for an internal combustion engine. The cylinder liner includes a cylindrical body including a first end, a second end opposite the first end, and a wall that extends from the first end to the second end along a longitudinal axis. The wall has an inner surface and an outer surface. At least one aperture extends through the wall between the inner surface and the outer surface. The at least one aperture includes a leading end surface and an opposite trailing end surface spaced from one another along the longitudinal axis. The at least one aperture further includes opposite side surfaces extending between the leading end surface and the trailing end surface. At least one of the leading end surface and the trailing end surface is obliquely oriented to the inner surface and the outer surface of the wall.

Another embodiment of the present application includes a method for installing a cylinder liner in an internal combustion engine having an engine block with a cylinder cavity. The method includes inserting the cylinder liner into the cylinder cavity to initially align an aperture in a wall of the cylinder liner with a port in the cylinder block; inserting an alignment tool through the aperture of the cylinder liner and the port of the engine block to finally align the aperture and the port; and securing the cylinder liner in the cylinder cavity to the engine block while the aperture of the cylinder is finally aligned with the port of the engine block.

This summary is provided to introduce a selection of concepts that are further described below in the illustrative embodiments. This summary is not intended to identify key or essential features of the claimed subject matter, nor is it intended to be used as an aid in limiting the scope of the claimed subject matter. Further embodiments, forms, objects, features, advantages, aspects, and benefits shall become apparent from the following description and drawings.

DETAILED DESCRIPTION OF THE ILLUSTRATED EMBODIMENTS

Figure 1:
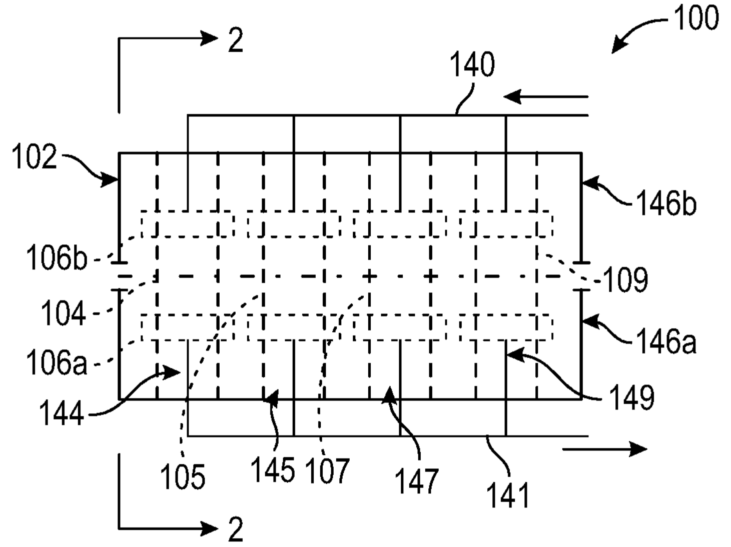
FIG. 1 is an schematic view of an embodiment of an internal combustion engine.

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

Figure 2:
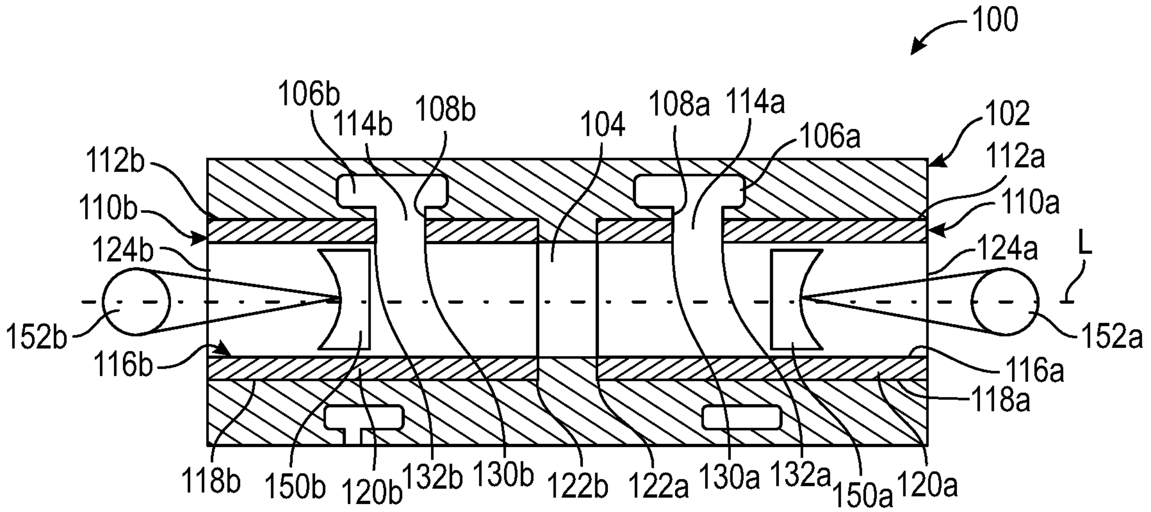
FIG. 2 is a section view of the internal combustion engine along line 2-2 of FIG. 1 that shows cylinder liners and pistons in a cylinder cavity of the internal combustion engine.

FIGS. 1-2 depict an embodiment of an internal combustion engine 100 according to one aspect of the present disclosure. Engine 100 includes an engine block 102 with at least one cylinder cavity 104 in the engine block 102. The engine block 102 includes at least one port 108*a*, 108*b* that opens into the cylinder cavity 104.

Engine 100 also includes at least one cylinder liner 110*a*, 110*b* extending axially along the cylinder cavity 104 and in contact with the engine block 102. The cylinder liner 110*a*, 110*b* includes a wall 112*a*, 112*b* and at least one aperture 114*a*, 114*b* that extends between an inner surface 116*a*, 116*b* of the wall 112*a*, 112*b* and an outer surface 118*a*, 118*b* of the wall 112*a*, 112*b*.

At the inner surface 116*a*, 116*b* of the wall 112*a*, 112*b*, the at least one aperture 114*a*, 114*b* is aligned with a projected opening of the at least one port 108*a*, 108*b*. At the outer surface 118*a*, 118*b* of the wall 112*a*, 112*b*, the at least one aperture 114*a*, 114*b* is offset outwardly from the opening of the at least one port 108*a*, 108*b*.

According to another aspect of the present disclosure, the cylinder liner 110*a*, 110*b* includes a cylindrical body 120*a*, 120*b* including a first end 122*a*, 122*b*, a second end 124*a*, 124*b* opposite the first end 122*a*, 122*b*, and a wall 112*a*, 112*b* extending along a longitudinal axis L from the first end 122*a*, 122*b* to the second end 124*a*, 124*b*. The wall 112*a*, 112*b* has an inner surface 116*a*, 116*b* and an outer surface 118*a*, 118*b*.

At least one aperture 114*a*, 114*b* extends through wall 112*a*, 112*b*. The at least one aperture 114*a*, 114*b* is defined by a leading end surface 130*a*, 130*b* and an opposite trailing end surface 132*a*, 132*b* spaced from one another along the longitudinal axis L. The at least one aperture 114*a*, 114*b* is further defined by opposite side surfaces 134*a*, 134*b* and 136*a*, 136*b* (FIG. 7) extending between the leading end surface 130*a*, 130*b* and the trailing end surface 132*a*, 132*b*. At least one of the leading end surface 130*a*, 130*b* and the trailing end surface 132*a*, 132*b* is obliquely oriented to the inner surface 116*a*, 116*b* and the outer surface 118*a*, 118*b* of the wall 112*a*, 112*b*.

According to another aspect of the present disclosure, a method for installing the cylinder liner 110*a*, 110*b* in the internal combustion engine 100 having an engine block 102 with a cylinder cavity 104 is disclosed. The method includes inserting the cylinder liner 110*a*, 110*b* into the cylinder cavity 104 to initially align the aperture 114*a*, 114*b* in wall 112*a*, 112*b* of the cylinder liner 110*a*, 110*b* with port 108*a*, 108*b* in the cylinder block 102; inserting an alignment tool 500, 510 (FIGS. 16-17) through the aperture 114*a*, 114*b* of the cylinder liner 110*a*, 110*b* and the port 108*a*, 108*b* of the engine block 102 to finally align the aperture 114*a*, 114*b* and the port 108*a*, 108*b*; and securing the cylinder liner 110*a*, 110*b* in the cylinder cavity 104 to the engine block 102 while the aperture 114*a*, 114*b* of the cylinder liner 110*a*, 110*b* is finally aligned with the port 108*a*, 108*b* of the engine block 102.

FIG. 1 depicts a schematic view of engine 100 with an intake system 140 and an exhaust system 141 connected to a plurality of combustion chambers 144, 145, 147, 149. The combustion chambers 144, 145, 147, 149 are formed within the cylinder cavities 104, 105, 107, 109, respectively. A pair of cylinder liners 110*a*, 110*b* is positioned in each of the cylinder cavities 104, 105, 107, 109.

Internal combustion engine 100 may be designed with a single cylinder or multiple cylinders. Some embodiments, for example, contemplate an engine 100 with pairs of cylinders ranging from two to twenty-four cylinders, although any number of cylinders is contemplated. In the illustrated embodiment, engine 100 includes four cylinders that are oriented to extend horizontally or laterally in the engine block 102.

Each of the cylinders extends between an exhaust side 146*a* and an intake side 146*b* of the combustion chambers 144, 145, 147, 149. Cylinder liners 110*a*, 110*b* and pistons 150*a*, 150*b* are positioned in so that cylinder liner 110*a* and piston 150*a* are housed on the exhaust side 146*a*, and cylinder liner 110*b* and piston 150*b* are housed on the intake side 146*b*. Pistons 150*a*, 150*b* are slidably received within the respective cylinder liner 110*a*, 110*b* and axially move in the combustion chamber along longitudinal axis L in response to rotation of the corresponding crankshaft 152*a*, 152*b* connected thereto.

In the present disclosure, cylinder liner 110*b* is the same as or similar to cylinder liner 110*a*, with each cylinder liner 110*a*, 110*b* being provided with apertures 114*a*, 114*b* corresponding to the number of exhaust ports 108*a* connected to exhaust passage 106*a* or intake ports 108*b* connected to intake passage 106*b* opening into the cylinder cavity 104. Any reference to one of the cylinder liners 110*a*, 110*b* in the discussion herein is applicable to the other cylinder liner 110*a*, 110*b* unless noted otherwise. However, embodiments in which the cylinder liners 110*a*, 110*b* have different configurations are not precluded.

Cylinder liners 110*a*, 110*b* are press fit into the respective portions of cylinder cavity 104. Cylinder liners 110*a*, 110*b* may be inserted into cylinder cavity 104 under conditions that create a press fit between the cylinder liner 110*a*, 110*b* and the engine block 102. A press fit, also known as an interference fit or friction fit, for example, creates an axial hold where adjoining parts share the same space by creating a slight elastic deformation and a compression force between the adjoining parts. Compression from the press fit increases the friction between the adjoining parts to a point where independent movement of the adjoining parts is not possible under normal operating conditions. Press fits between the cylinder liner 110*a*, 110*b* and engine block 102 may be created using principles of thermal expansion, physical presses, or other suitable method.

Figure 3:
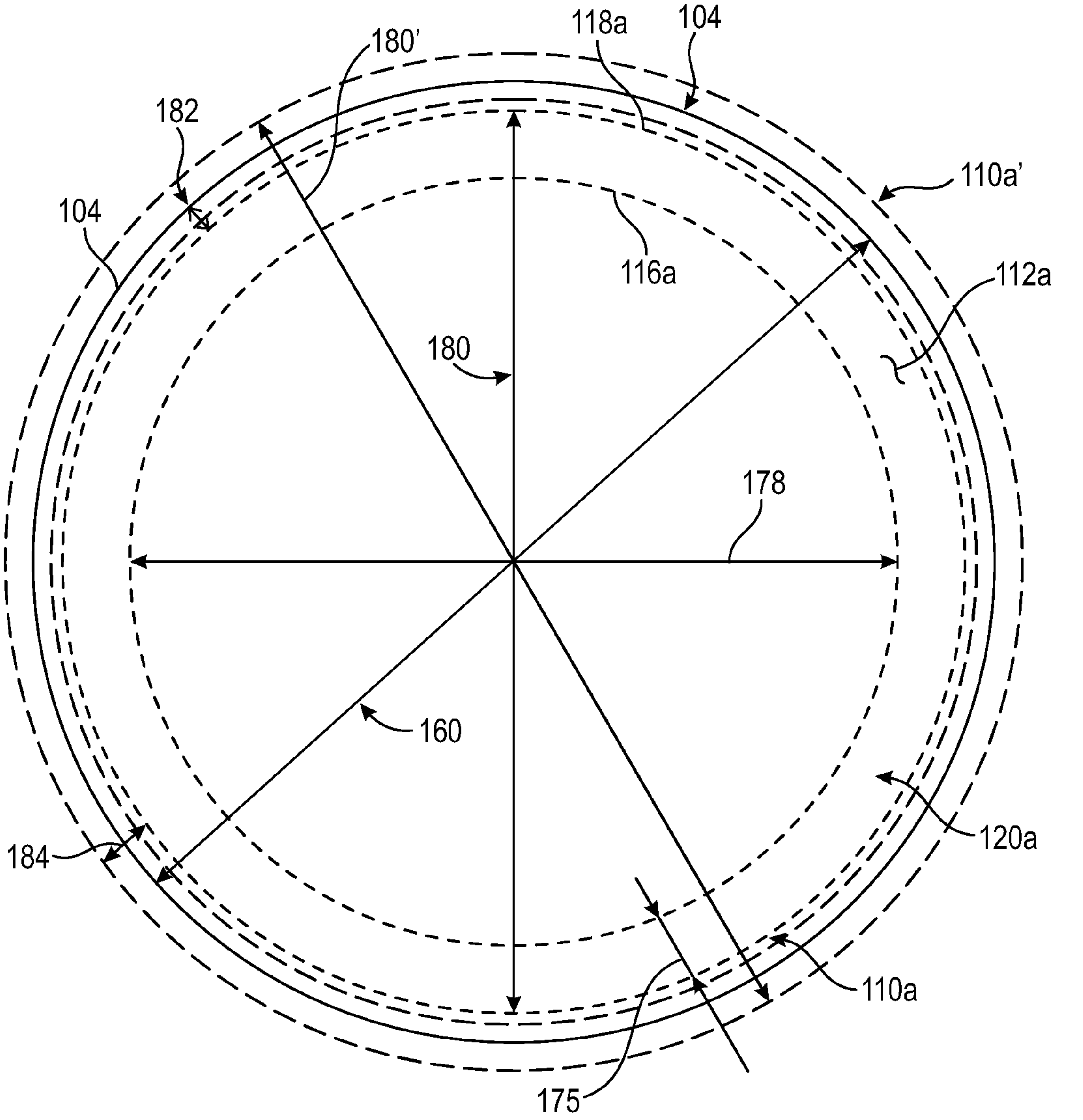
FIG. 3 is a schematic end view of the cylinder cavity along with the cylinder liner configured prior to insertion into the cavity and after insertion into the cavity.

Referring to FIG. 3, cylinder liner 110*a* is shown in a final configuration as inserted in the cylinder cavity 104, and in an initial configuration 110*a*' before insertion. Cylinder cavity 104 includes a block inner diameter 160 that is formed by boring, machining, honing, and/or otherwise creating the cylinder cavity 104 in block 102. Cylinder liner 110*a* includes cylindrical body 120*a* with wall 112*a* having inner surface 116*a* defining an inner diameter 178 and an opposite outer surface 118*a* defining an outer diameter 180. The wall 112*a* includes a thickness 175 between the inner and outer surfaces 116*a*, 118*a*.

The outer surface 118*a* of cylinder liner 110*a* is press fit into contact with the inner diameter 160 of engine block 102. The press fit can be provided by arranging the inner diameter 160 of cylinder cavity 104 to be slightly smaller than the outer diameter 180' of cylinder liner 110*a*' in its un-inserted configuration so that energy must be applied to cylinder liner 110*a*' to size it for insertion into cylinder cavity 104.

In the illustrated embodiment, cylinder liner 110*a*' has an outer diameter 180' that is greater than inner diameter 160 of the cylinder cavity 104. Cylinder liner 110*a*' is shrunk, compressed, deformed or otherwise made smaller in size for insertion into cylinder cavity 104. For example, outer diameter 180' can be shrunk as indicated by reduction 184 to outer diameter 180, which is less than block inner diameter 160, providing a clearance 182 for insertion of the cylinder liner 110*a* into cavity 104. The cylinder liner 110*a* is then inserted into cylinder cavity 104, and then expands, reforms, or otherwise enlarges after insertion so that outer surface 118*a* press fits against the block inner diameter 160 of cylinder cavity 104.

Cylinder liners 110*a*, 110*b* can be positioned in a new engine build. Alternatively, cylinder liners 110*a*, 110*b* can be used in an engine re-build to replace existing cylinder liners, or to restore a parent, non-linered bore after machining the engine block to accept the cylinder liner 110*a*, 110*b* and provide appropriate clearances for the piston and other components of the cylinder.

Figure 4:
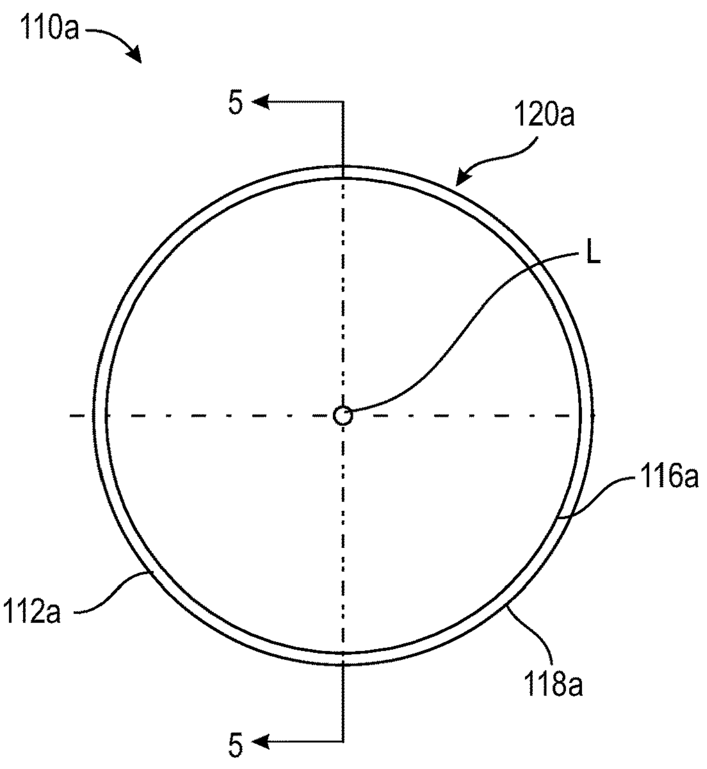
FIG. 4 is an end elevation view of an embodiment of the cylinder liner.
Figure 5:
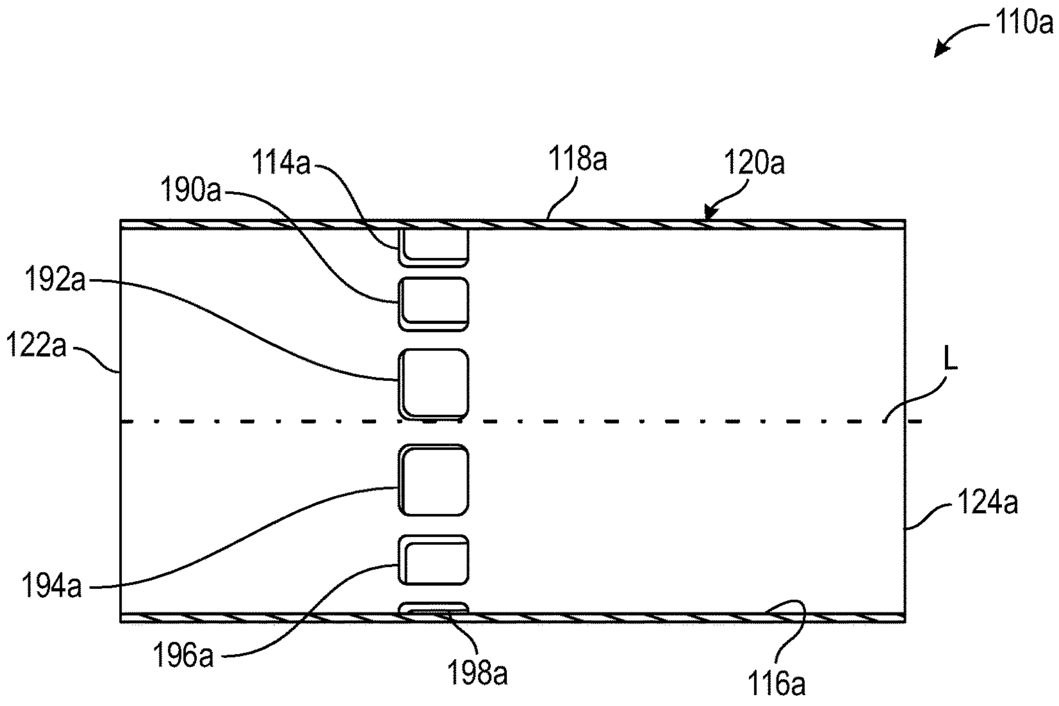
FIG. 5 is a section view of the cylinder liner along line 5-5 of FIG. 4.

Referring to FIGS. 4-5, further details of an embodiment of the cylinder liner 110*a*, 110*b* are shown and discussed with respect to cylinder liner 110*a*. As discussed above, cylinder liner 110*a* includes cylindrical body 120*a* is formed by wall 112*a*. Wall 112*a* extends along longitudinal axis L between first end 122*a* of the body 120*a* and opposite second end 124*a* of the body 120*a*.

A plurality of apertures 114*a*, 190*a*, 192*a*, 194*a*, 196*a*, 198*a*, etc. are equally spaced circumferentially about wall 112*a* and extend between inner surface 116*a* of the wall 112*a* and outer surface 118*a* of the wall 112*a*. In other embodiments, the apertures 114*a*, 190*a*, 192*a*, 194*a*, 196*a*, 198*a*, etc. are unequally spaced. Each of the apertures 114*a*, 190*a*, 192*a*, 194*a*, 196*a*, 198*a*, etc. aligns with a corresponding intake port or exhaust port of the engine block 102 that opens into cylinder cavity 104. In an embodiment, the apertures 114*a*, 190*a*, 192*a*, 194*a*, 196*a*, 198*a*, etc. are located along longitudinal axis L closer to first end 122*a* than second end 124*a*. However, other embodiments contemplate other locations for the apertures 114*a*, 190*a*, 192*a*, 194*a*, 196*a*, 198*a*, etc. along longitudinal axis L.

Figure 6:
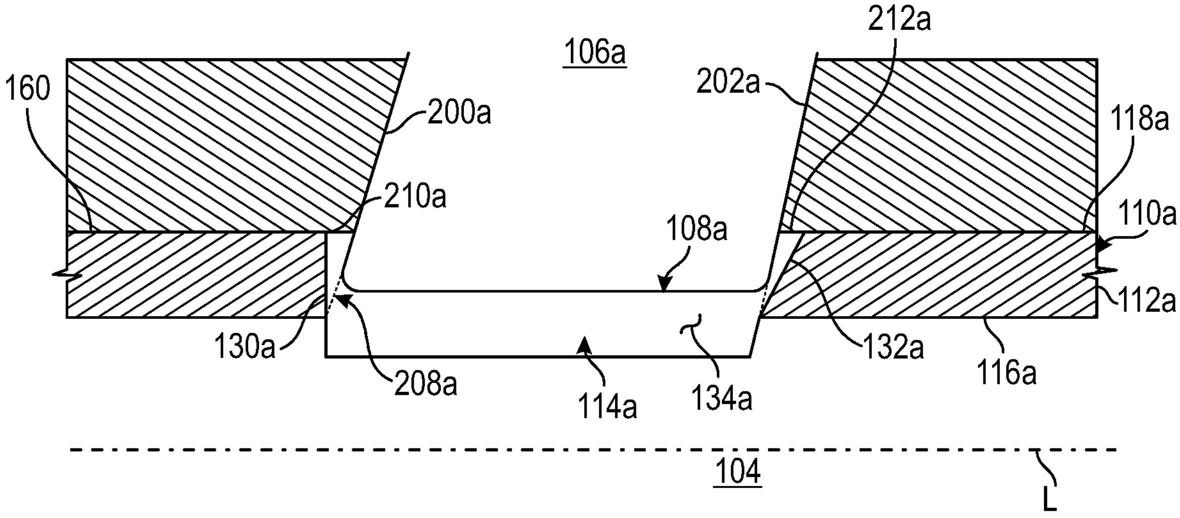
FIG. 6 is a section view showing an aperture of the cylinder liner of FIG. 4 and its positioning relative to a port in the block of the internal combustion engine.
Figure 7:
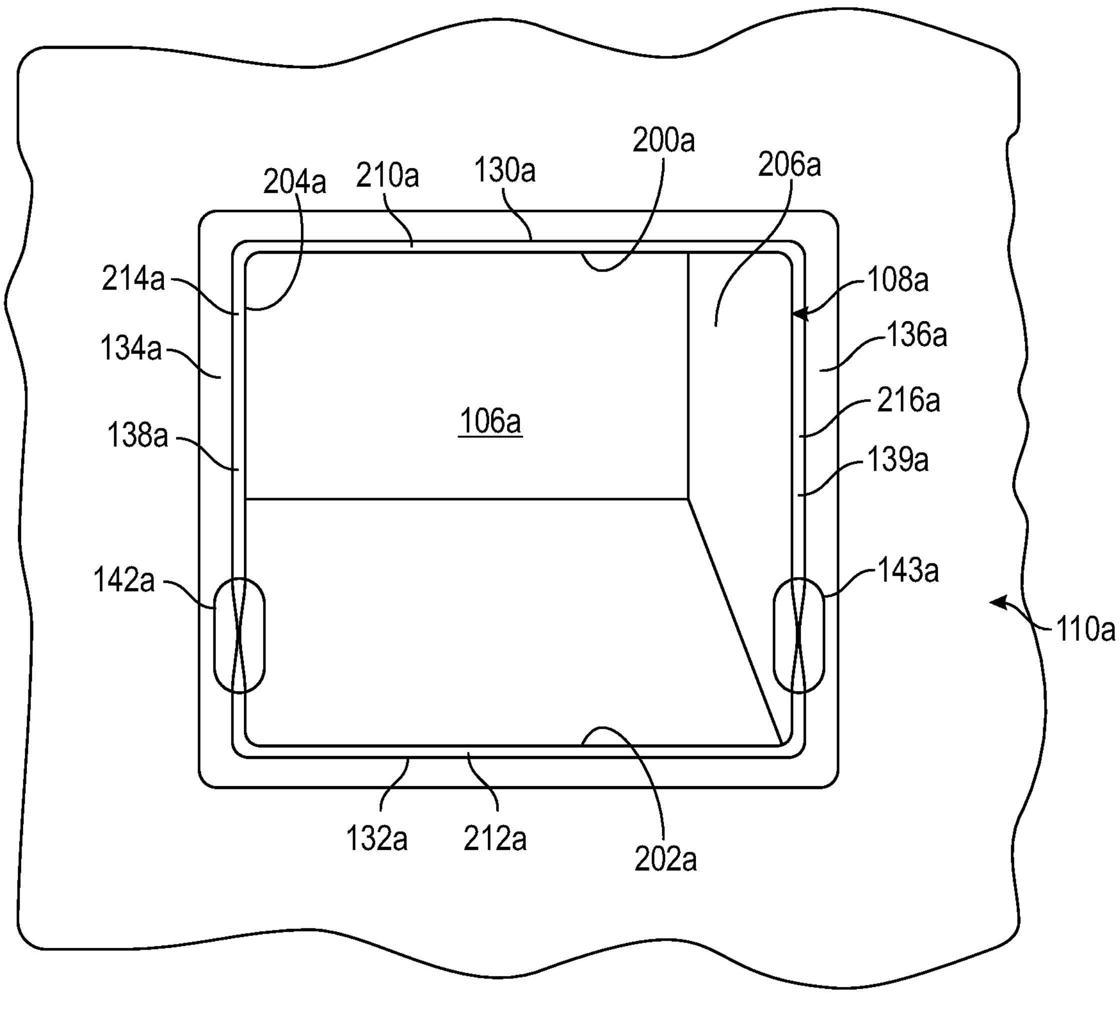
FIG. 7 is an elevation view showing the aperture of FIG. 6 and its positioning relative to the port in the block of the internal combustion engine.

Referring further to FIGS. 6-7, the relative alignment between the apertures 114*a*, 190*a*, 192*a*, 194*a*, 196*a*, 198*a*, etc. and the corresponding exhaust port 108*a* or intake port 108*b* is shown by reference to aperture 114*a*, exhaust port 108*a*, and the opening of exhaust port 108*a* into cylinder cavity 104. The other apertures of cylinder liner 110*a* can be configured the same as aperture 114*a*.

Aperture 114*a* is defined by leading end surface 130*a* and opposite trailing end surface 132*a* of wall 112*a* that are spaced longitudinally from one another along the longitudinal axis L. The leading end surface 132*a* may also be referred to as the timing edge of aperture 114*a*. Aperture 114*a* is further defined by opposite side surfaces 134*a*, 136*a* of wall 112*a* that extend between the leading end surface 130*a* and the trailing end surface 132*a* along longitudinal axis L.

Port 108*a* includes a leading side 200*a* and an opposite trailing side 202*a* spaced longitudinally from one another. Leading side 200*a* is located adjacent to leading end surface 132*a*, and is closest to top-dead-center of the corresponding piston as the piston moves axially along the combustion chamber along longitudinal axis L. Port 108*a* also include opposite longitudinal sides 204*a*, 206*a* that extend from leading side 200*a* to trailing side 202*a*. The sides 200*a*, 202*a*, 204*a*, 206*a* define the port 108*a* opening at the inner diameter 160 of cylinder cavity 104. It is desirable to provide a precise alignment of aperture 114*a* with port 108*a* so that the performance characteristics provided by the shaped sides 200*a*, 202*a*, 204*a*, 206*a* of port 108*a* is maintained after cylinder liner 110*a* is installed.

In the illustrated embodiment, leading side 200*a* is convexly curved into port 108*a*, and is obliquely oriented to longitudinal axis L in a direction toward the top-dead-center position of the corresponding piston in the combustion chamber. Trailing side 202*a* is also obliquely oriented to longitudinal axis L in the same direction as leading side 200*a*. Trailing side 202*a* can be less convexly curved than leading side 200*a*, or even linear, near port 108*a*.

Cylinder liner 110*a* is configured so that at the inner surface 116*a* of the wall 112*a*, the aperture 114*a* is aligned with a projection 208*a* of the opening of port 108*a* through the wall 112*a* of the cylinder liner 110*a*. In this configuration, the aperture 114*a* is a continuation or projection of the port 108*a* at the inner surface 116*a* of cylinder liner 110*a* to maintain the desired performance characteristics of port 108*a* even after the cylinder liner 110*a* is installed. Aperture 114*a* is partially offset from opening of port 108*a* at the outer surface 118*a* of the wall 112*a* to ensure that cylinder liner 110*a* does not obstruct or constrict port 108*a* in the event precise alignment is not achievable. This back taper of leading end surface 130*a* and trailing end surface 132*a* forms a first offset area 210*a* along cavity 104 between leading surface 130*a* and the opening of port 108*a* adjacent to leading end surface 130*a*. A second offset area 212*a* is formed along cavity 104 between trailing end surface 132*a* and the opening of port 108*a*.

In an embodiment, the leading end surface 130*a* and trailing end surface 132*a* of aperture 114*a* are tapered away from projection 208*a* from inner surface 116*a* toward outer surface 118*a*. At the outside diameter of wall 112*a*, the aperture 114*a* is offset from or spaced outwardly from the opening of port 108*a* to form offset areas 210*a*, 212*a*, shown in the shaded areas of FIG. 7. This configuration ensures cylinder liner 110*a* does not obstruct flow from or into the aligned port 108*a*.

The opposite side surfaces 134*a*, 136*a* of wall 112*a* may also be aligned with the projection 208*a* of port 108*a* at inner surface 116*a* of wall 112*a*. As shown in FIG. 7, the opposite side surfaces 134*a*, 136*a* are partially outwardly offset from the opening of port 108*a* at outer surface 118 along offset segments 138*a*, 139*a* of each of the sides surfaces 134*a*, 136*a*. This back taper of side surfaces 134*a*, 136*a* forms a third offset area 214*a* along cavity 104 between side surface 134*a* and the opening of port 108*a* adjacent to side surface 134*a*. A fourth offset area 216*a* is formed along cavity 104 between side surface 136*a* and the opening of port 108*a*.

Side surfaces 134*a*, 136*a* also include aligned segments 142*a*, 143*a* that are aligned with the opening of port 108*a* at outer surface 118*a* of wall 112*a*. The aligned segments 142*a*, 143*a* can be used to precisely rotationally align the aperture 114*a* with port 108*a* using an alignment tool, as discussed further below.

In an embodiment, one or both of the leading end surface 130*a* and the trailing end surface 132*a* is obliquely oriented to the inner surface 116*a* and the outer surface 118*a* of the wall 112*a*. The angles or orients the leading end surface 130*a* and trailing end surface 132*a* toward the top-dead-center position of the corresponding piston in the combustion chamber. In an embodiment, one or both of the leading end surface 130*a* and the trailing end surface 132*a* is obliquely oriented to the longitudinal axis L in the direction toward top-dead-center of the piston in the combustion chamber.

Figure 8:
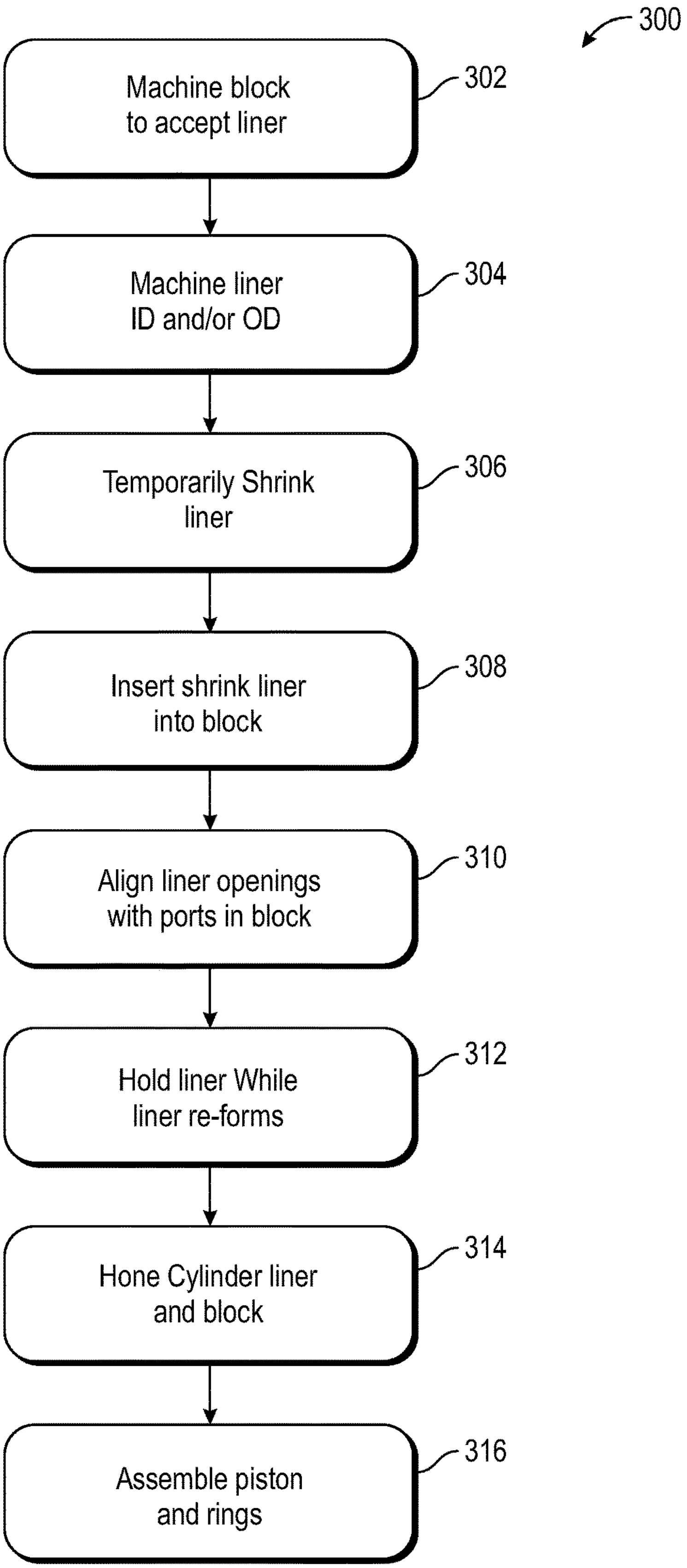
FIG. 8 is a flow diagram of a procedure for installing the cylinder liner of the present disclosure into a cylinder cavity of an internal combustion engine.

Referring to FIG. 8, one embodiment of a process or method for installing a cylinder liner, such as cylinder liners 110*a*, 110*b*, is shown. Process 300 includes a step 302 to machine the engine block 102 to accept the cylinder liners 110*a*, 110*b*. In an embodiment, the block 102 is machined by milling, cutting, honing, etc. to conform to cylinder liner interface specifications to accept a dry cylinder liner that is not exposed to coolant after installation. The machining of the block 102 can be performed in a new engine build, or in a re-build or re-manufacture of an existing engine. In a re-build, the existing cylinder cavities are enlarged to accept the cylinder liners 110*a*, 110*b*.

Figure 9:
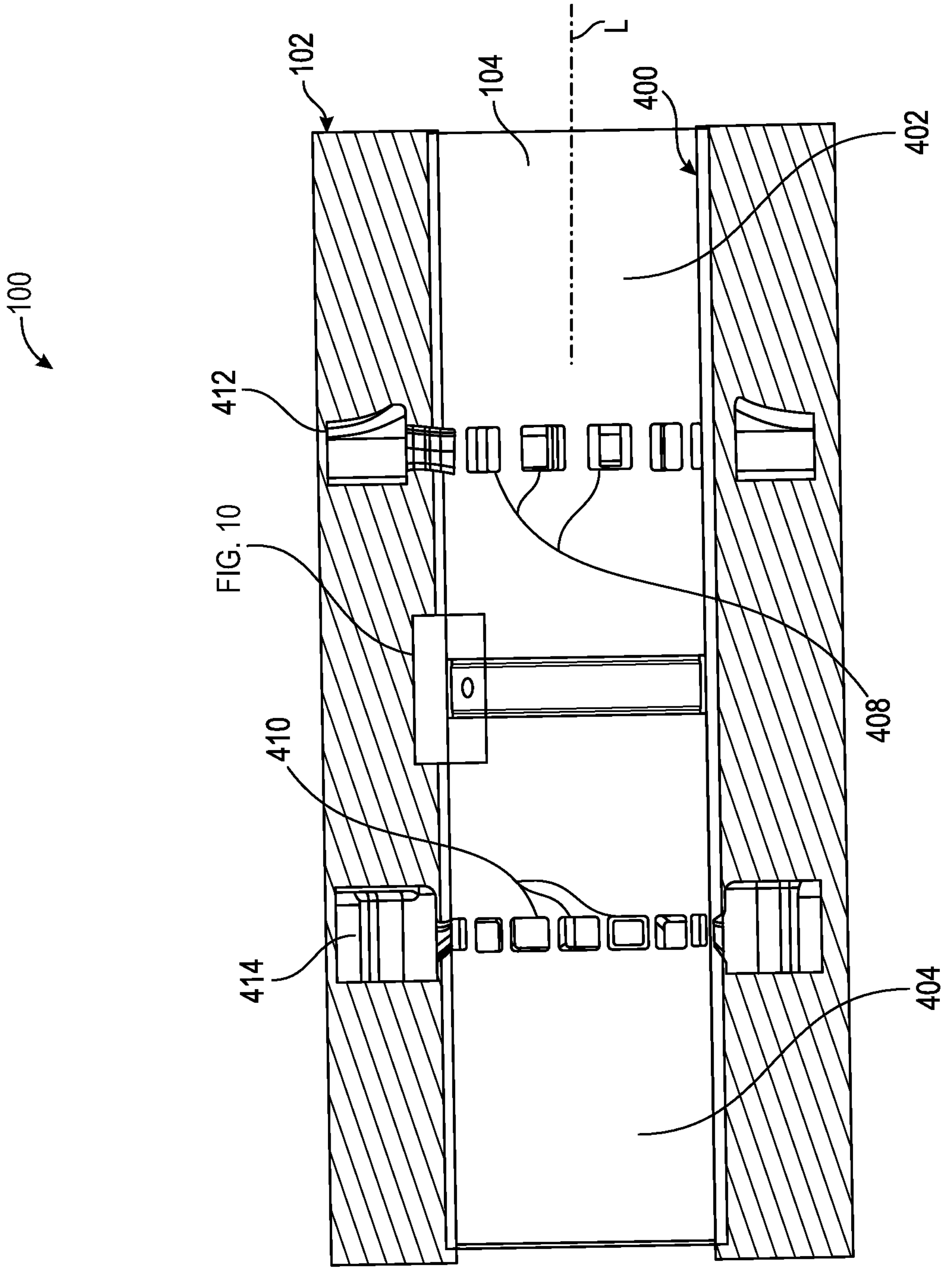
FIG. 9 is a section view showing an embodiment of a cylinder cavity in an engine block for an internal combustion engine that is prepared to accept a cylinder liner.
Figure 10:
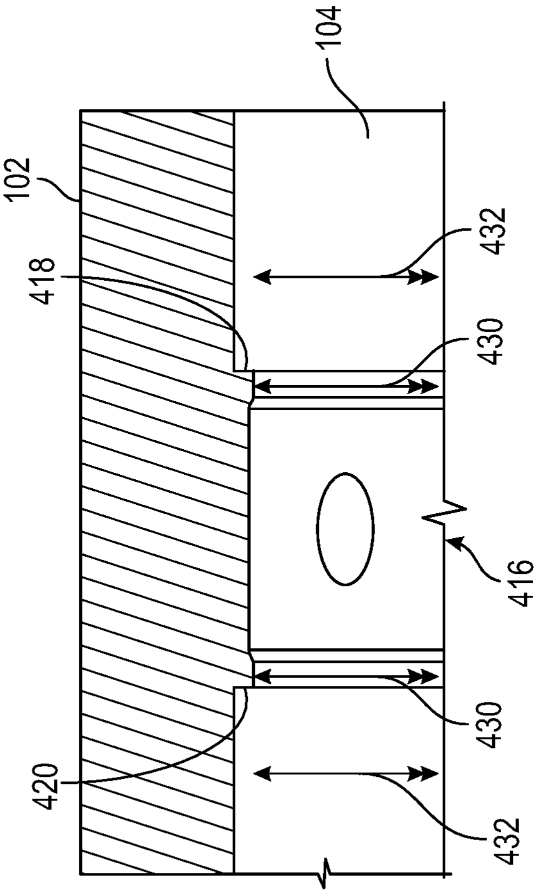
FIG. 10 is an enlarged view of a portion of FIG. 9.

An example of a machined cylinder cavity 104 is shown in FIGS. 9-10. Machined cylinder cavity 104 includes a longitudinal bore 400 formed in block 102. The bore 400 includes an exhaust side 402 and an intake side 404 spaced longitudinally from one another along longitudinal axis L. Exhaust side 402 includes a plurality of exhaust ports 408 in fluid communication with an exhaust passage 412. Exhaust ports 408 open into cylinder cavity 104. Intake side 404 includes a plurality of intake ports 410 in fluid communication with an intake passage 414 in block 102. Intake ports 410 open into cylinder cavity 104.

The number of exhaust ports 408 and intake ports 410 need not be the same. For example, there can be more intake ports 410 than exhaust ports 408. However, the number of apertures 114*a*, 114*b* in the cylinder liners 110*a*, 110*b* corresponds to the number of exhaust ports 408 or intake ports 410, depending on which side 402, 404 of the cylinder cavity the cylinder liner 110*a*, 110*b* is to be installed.

A liner stop region 416 is provided in bore 400 between exhaust side 402 and intake side 404. Liner stop region 416 includes a baseline diameter 430 and an oversize diameter 432. The differences in diameters 430, 432 form a first lip 418 and a second lip 420 longitudinally spaced from first lip 418. Lips 418, 420 project into cylinder cavity 104 and provide an axial abutment against which an end of the corresponding cylinder 110*a*, 110*b* is positioned upon insertion. Lips 418, 420 provide the desired axial alignment of the cylinder liners 110*a*, 110*b* in the cylinder cavity 104. In an embodiment, the inner diameter of cylinder liners 110*a*, 110*b* aligns with the baseline diameter 430, such as after finishing for unfinished liners or upon insertion for pre-finished liners.

After machining the cylinder cavity 104 to accept the cylinder liners 110*a*, 110*b*, process 300 continues at step 304 to machine the cylinder liners 110*a*, 110*b* so the inner diameter (ID) and/or outer diameter (OD) of each are configured for insertion into the prepared cylinder cavity 104.

Figure 11:
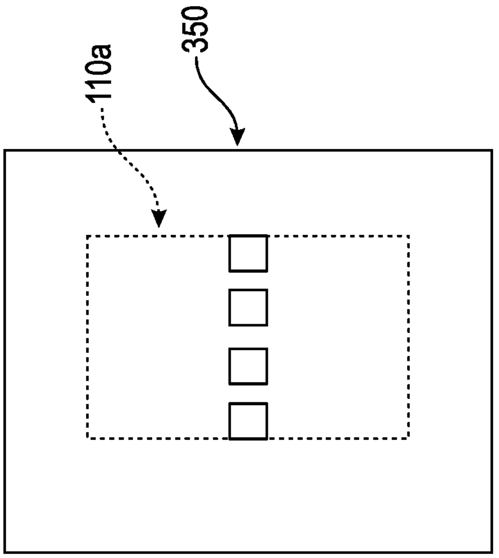
FIG. 11 is a schematic view of a cylinder liner submerged in a cooling solution.

At step 306 one of the prepared cylinder liners 110*a*, 110*b* is temporarily shrunk to be able to be inserted into the cylinder cavity 104. For example, as shown in FIG. 11, the cylinder liner 110*a* can be submerged in a cooling device 350 capable of providing sufficient temperature change the outer diameter of the submerged cylinder liner 110*a*. Cooling device 350 can be, for example, a bath with liquid nitrogen, helium, oxygen, or other cooling fluid. The amount of diameter change can be determined as a function of the coefficient of thermal expansion of the material of the cylinder liner 110*a*, the temperature change, and the pre-shrunk liner outer diameter 180'. The inner diameter 160 of the cylinder cavity 104 can be determined based on the amount of diameter change for the chilled cylinder liner 110*a* and the desired clearance between the outer diameter 180 of the chilled cylinder liner 110*a* and the inner diameter 160 of the cylinder cavity 104 during insertion, and the desired interface pressure between the cylinder liner 110*a* and the cylinder cavity 104.

Figure 12:
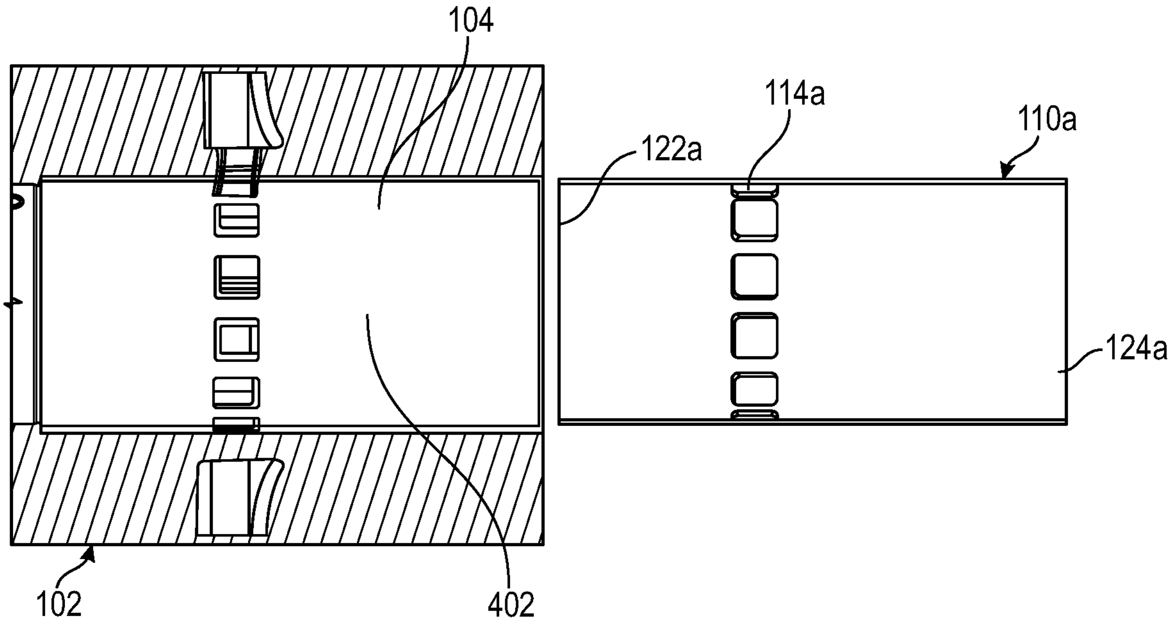
FIG. 12 is a section view showing the cylinder liner positioned for insertion into the prepared cylinder cavity.
Figure 13:
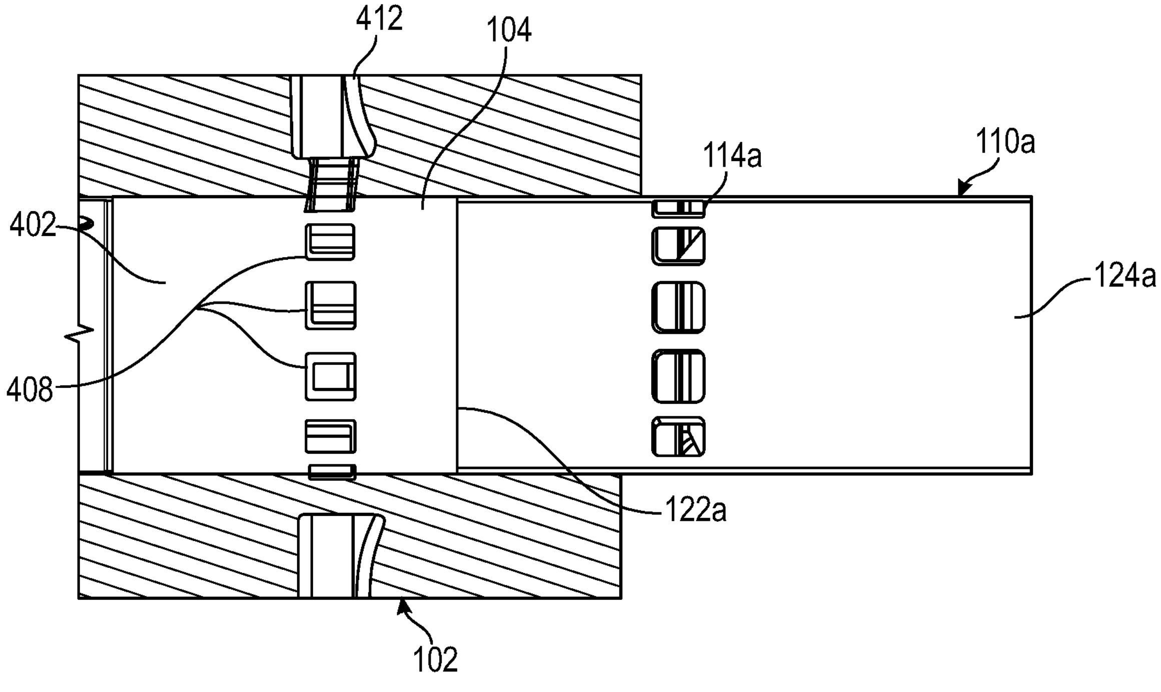
FIG. 13 is a section view showing the cylinder liner being inserted into the cylinder cavity.
Figure 14:
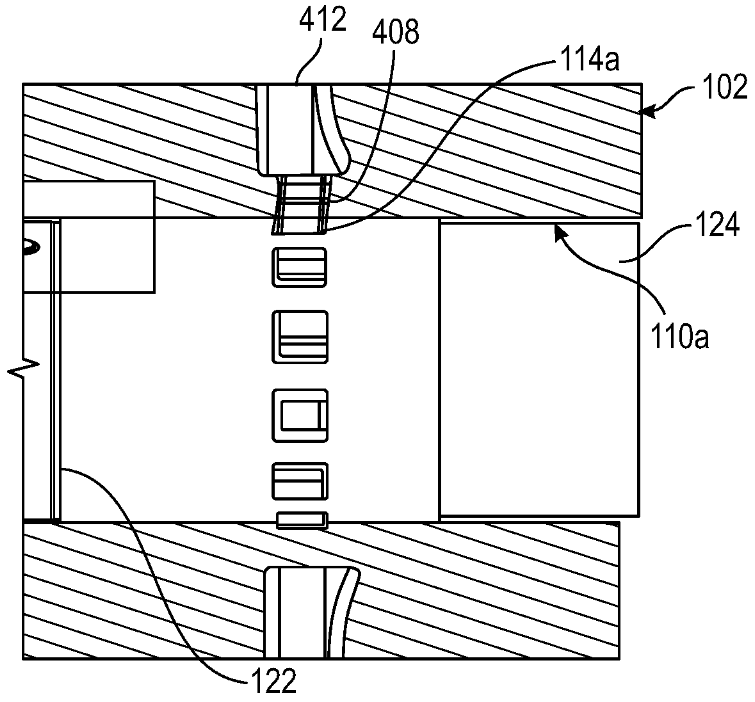
FIG. 14 is a section view showing the cylinder liner fully inserted into the cylinder cavity.
Figure 15:
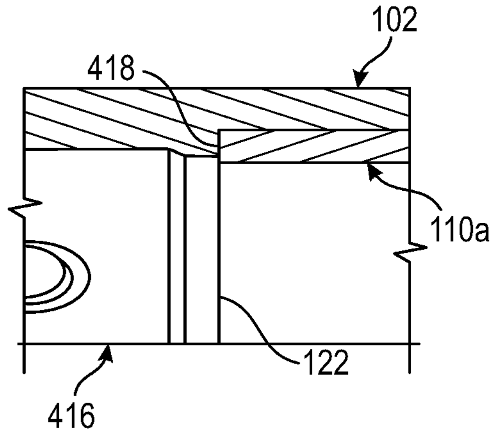
FIG. 15 is an enlarged view of a portion of FIG. 14.

Process 300 continues at step 308 in which the shrunk cylinder liner 110*a* is inserted into the cylinder cavity 104 of block 102. The insertion of cylinder liner 110*a* into exhaust side 402 of cavity 104 is shown in FIGS. 12-15. In FIG. 12, the cylinder liner 110*a* is shown in alignment for insertion into the exhaust side 402 of cylinder cavity 104. In FIG. 13 the first end 122*a* of cylinder liner 110*a* is inserted partially into cylinder cavity 104. Cylinder liner 110*a* is moved axially along cylinder cavity 104 along longitudinal axis L until first end 122*a* contacts lip 418 in cylinder cavity 104, axially locating the cylinder liner 110*a* in cylinder cavity 104. In this position, the apertures 114*a*, etc. are axially aligned with the exhaust ports 408.

Process 300 continues at step 310 to align the apertures 114*a*, etc. of the cylinder liner 110*a* with the exhaust ports 408 of the engine block 102. Step 310 is performed before the shrunk cylinder liner 110*a* expands to press fit against the engine block 102. An alignment tool 500, 510 is placed through aperture 114*a* and into contact with block 102 to align all the apertures of the cylinder liner 110*a* with corresponding exhaust ports 408. A similar process can be employed for the intake side cylinder liner.

Figure 16:
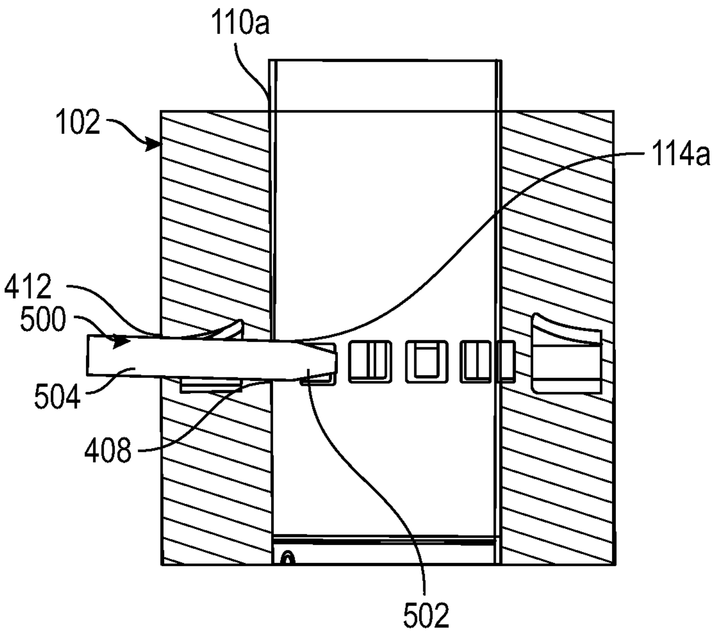
FIG. 16 is a section view showing one embodiment alignment tool inserted into the cylinder block to align the cylinder liner apertures with the ports in the engine block.

In an embodiment, an alignment tool 500 is inserted through one of the exhaust ports 408 in the engine block 102 and through a corresponding aperture 114*a* to align the aperture 114*a* with at least one exhaust port 408, as shown in FIG. 16. Alignment tool 500 includes a tapered end 502 to facilitate insertion through the port 408 and aperture 114*a*. The tapered end 502 extends from a shaft portion 504. Shaft portion 504 is sized to contact cylinder liner 110*a* along the aligned segments 142*a*, 143*a* of side surface 134*a*, 136*a* of aperture 114*a* and the adjacent sides of port 408. This contact rotationally aligns all the apertures of cylinder liner 110*a* with the corresponding ports 408 of cylinder cavity 104.

Figure 17:
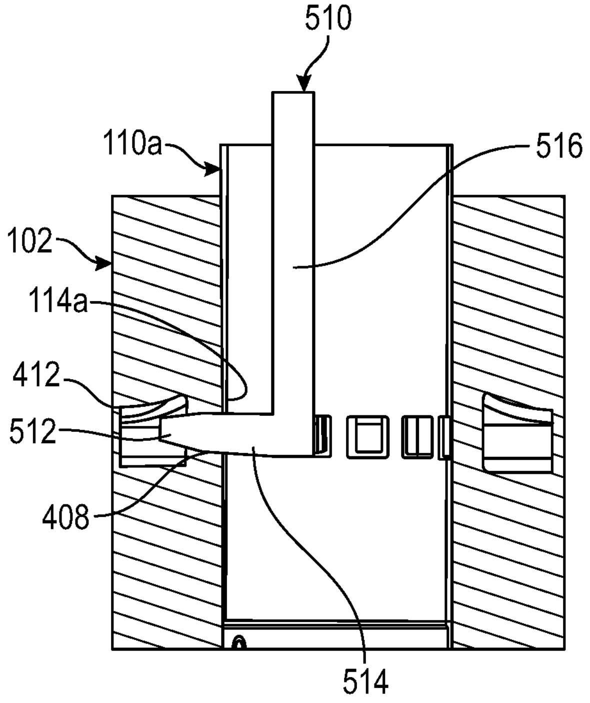
FIG. 17 is a section view showing another embodiment alignment tool inserted into the cylinder block to align the cylinder liner apertures with the ports in the engine block.

In an embodiment, an alignment tool 510 is inserted through the cylinder liner 110*a*, and then through an aperture 114*a* of the cylinder liner 110*a* and corresponding exhaust port 408, as shown in FIG. 17. Alignment tool 510 includes a tapered end 512 extending from a distal shaft portion 514 to facilitate insertion through the port 408 and aperture 114*a*. The distal shaft portion 514 is angled relative to a proximal shaft portion 516. The proximal shaft portion 516 extends axially along the cylinder liner 110*a*, and the distal shaft portion 514 is sized and configured to allow alignment tool 510 to be inserted through the cylinder liner 110*a* and then manipulated to position the distal shaft portion 514 through the aperture 114*a* and the exhaust port 408. The distal shaft portion 514 contacts aperture 114*a* along aligned segments 142*a*, 143*a* and exhaust port 408 to rotationally align all the apertures of the cylinder liner 110*a* with corresponding exhaust ports 408 in the cylinder cavity 104.

Process 300 continues at step 312 to securely hold the aligned cylinder liner 110*a* while it expands, re-forms, or otherwise engages the cylinder block 102 in the desired axial location along longitudinal axis L and rotational orientation in the cylinder cavity 104. At step 314 the cylinder liner 110*a* and block 102 are honed to final specifications after the cylinder liner 110*a* is press fit into aligned engagement in the cylinder cavity 104. At step 316 the piston and piston rings are assembled in the combustion chamber formed by the inserted cylinder liner 110*a*. Process 300 can be repeated as needed for insertion of cylinder liner 110*b* in the intake side

404, and for insertion of cylinder liners 110*a*, 110*b* in the other cylinder cavities of the engine block 102.

Figure 18:
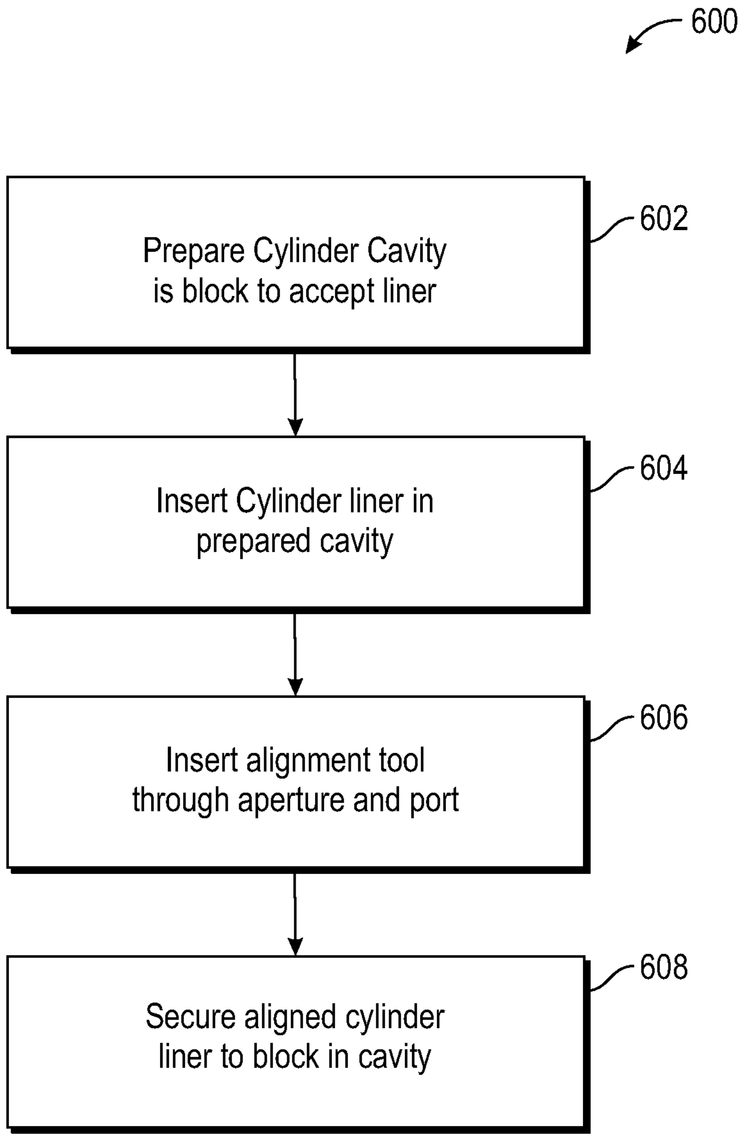
FIG. 18 is a flow diagram of another embodiment procedure for installing the cylinder liner of the present disclosure into a cylinder cavity of an internal combustion engine.

Referring to FIG. 18, a method 600 for installing cylinder liner 110*a* in internal combustion engine 100 is provided. Cylinder liner 110*a* may be "pre-finished" before insertion, or may be finished after insertion. Method 600 includes an operation 602 to prepare cylinder cavity 104 of engine block 102 to accept the cylinder liner 110*a*. Method 600 includes an operation 604 to insert the cylinder liner 110*a* into the cylinder cavity 104 to initially align an aperture 114*a* in wall 112*a* of the cylinder liner 110*a* with port 108*a* in the cylinder block 102.

Method 600 includes an operation 606 to insert an alignment tool 500, 510 through the aperture 114*a* of the cylinder liner 110*a* of the engine block 102 to finally align the aperture 114*a* and the port 108*a*. Method 600 includes an operation 608 to secure the cylinder liner 110*a* in the cylinder cavity 104 to the engine block 102 while the aperture 114*a* of the cylinder liner 110*a* is finally aligned with the port 108*a* of the engine block 102. In an embodiment, the "finally" aligned aperture 114*a* is aligned with port 108*a* in an axial direction along longitudinal axis L and in a rotational direction about longitudinal axis L.

In an embodiment, method 600 includes contracting an outer diameter of the cylinder liner 110*a* before inserting the cylinder liner 110*a* into the cylinder cavity 104 of the engine block 102. In an embodiment, contracting the outer diameter of the cylinder liner 110*a* includes placing the cylinder liner 110*a* in a cooling device containing a liquid coolant, such as liquid nitrogen, before inserting the cylinder liner 110*a* into the cylinder cavity 104. In an embodiment, cylinder liner 110*a* is formed from a material with characteristics that allow cylinder liner 110*a* to contract in size for insertion by subjecting the material to a temperature change, such as by cooling or lowering the material temperature.

In embodiment, the cylinder liner 110*a* is secured to the block 102 by expanding the outer diameter of the cylinder liner 110*a* into a press fit with the engine block 102 in the cylinder cavity 104 while the alignment tool 500, 510 aligns the aperture 114*a* with the port 108*a*. In an embodiment, cylinder liner 110*a* is formed from a material with characteristics that allow cylinder liner 110*a* to expand in size from a contracted state after insertion of the cylinder liner 110*a*, such as by heating cylinder liner 110*a* or allowing the material temperature of cylinder liner 110*a* to increase from a reduced temperature that caused contraction.

In an embodiment of method 600, inserting the alignment tool 500 includes first inserting the alignment tool 500 through the port 108*a* in the cylinder block 102 and then into the aperture 114*a* of the cylinder liner 110*a*.

In an embodiment of method 600, inserting the alignment tool 510 includes first inserting the alignment tool 510 through the cylinder liner 110*a*, and then through the aperture 114*a* and into the port 108*a* in the cylinder block 102.

In an embodiment of method 600, inserting the cylinder liner 110*a* into the cylinder cavity 104 includes positioning an end 122*a* of the cylinder liner 110*a* in abutting engagement with a lip 418 in the cylinder cavity 104 to axially locate the cylinder liner 110*a* in the cylinder cavity 104 along longitudinal axis L.

In an embodiment of method 600, the alignment tool 500, 510 rotates the cylinder liner 110*a* about a longitudinal axis L of the cylinder liner 110*a* as the alignment tool 500, 510 is inserted through the aperture 114*a* of the cylinder liner 110*a*.

Various aspects of the present disclosure are contemplated. According to one aspect, an internal combustion engine includes an engine block with at least one cylinder cavity in the engine block. The at least one cylinder cavity extends axially along a longitudinal axis, and the engine block includes at least one port that opens into the cylinder cavity. A cylinder liner extends axially along the cylinder cavity and in contact with the engine block. The cylinder liner includes a wall and at least one aperture that extends between an inner surface of the wall and an outer surface of the wall. At the inner surface of the wall, the at least one aperture is aligned with a projected opening of the at least one port, and at the outer surface of the wall the at least one aperture is offset outwardly from the opening of the at least one port into the cylinder cavity.

In an embodiment, the engine block includes a plurality of ports positioned circumferentially around the cylinder cavity, and each of the plurality of ports opens into the cylinder cavity. The cylinder liner includes a plurality of apertures, and at the inner surface of the wall each of the plurality of apertures is aligned with a projection of the opening of a respective one of the plurality of ports.

In an embodiment, the engine block includes at least one intake port at a first axial location along the cylinder cavity and at least one exhaust port at a second axial location along the cylinder cavity. The cylinder liner includes a first cylinder liner with at least one aperture aligned with the at least one intake port and a second cylinder liner with at least one aperture aligned with the at least one exhaust port. In a refinement of this embodiment, engine includes a first piston axially movable along the first cylinder liner and a second piston axially movable along the second cylinder liner.

In an embodiment, the cylinder liner is contracted in size for insertion into the cylinder cavity and expands after insertion to press fit the outer surface of the wall into contact with the cylinder block. In an embodiment, the engine block includes a lip in the at least one cylinder cavity, and the wall of the cylinder liner extends from a first end to an opposite second end, and the first end is in abutting contact with the lip.

In an embodiment, the at least one aperture of the cylinder liner is defined by a leading end surface, an opposite trailing end surface spaced from the leading end surface, and opposite side surfaces extending axially along the longitudinal axis between the leading end surface and the trailing end surface. The leading end surface and the trailing end surface are each offset along the longitudinal axis from the opening of the at least one port at the outer surface of the wall of the cylinder liner. The opposite side surfaces each include a first portion aligned with the opening of the least one port at the outer surface of the wall of the cylinder liner and a second portion circumferentially offset from the opening of the at least one port at the outer surface of the wall of the cylinder liner.

According to another aspect of the disclosure, a cylinder liner for an internal combustion engine is provided. The cylinder lines includes a cylindrical body including a first end, a second end opposite the first end, and a wall. The wall extends along a longitudinal axis from the first end to the opposite second end of the body, and the wall has an inner surface and an outer surface. The cylinder liner also includes at least one aperture extending between the inner surface and the outer surface. The at least one aperture is defined by a leading end surface and an opposite trailing end surface spaced from one another along the longitudinal axis. The at least one aperture is further defined by opposite side surfaces extending between the leading end surface and the trailing end surface. At least one of the leading end surface and the trailing end surface is obliquely oriented to the inner surface and the outer surface of the wall.

In an embodiment, each of the leading end surface, the trailing end surface, and the opposite side surfaces is obliquely oriented to the inner surface and the outer surface of the wall. In an embodiment, the opposite side surfaces are non-parallel to one another so that the at least one aperture is larger adjacent one of the leading end surface and the trailing end surface than the other of the leading end surface and the trailing end surface.

In an embodiment, the at least one aperture includes a plurality of apertures circumferentially distributed about the wall of the cylinder liner. In an embodiment, the at least one aperture is located closer to one of the first end and second end of the body of the cylinder liner than the other of the first end and second end of the body.

According to another aspect, a method for installing a cylinder liner in an internal combustion engine having an engine block with a cylinder cavity includes: inserting the cylinder liner into the cylinder cavity to initially align an aperture in a wall of the cylinder liner with a port in the cylinder block; inserting an alignment tool through the aperture of the cylinder liner to finally align the aperture and the port; and securing the cylinder liner in the cylinder cavity to the engine block while the aperture of the cylinder liner is finally aligned with the port of the engine block.

In an embodiment, the method includes contracting an outer diameter of the cylinder liner before inserting the cylinder liner into the cylinder cavity of the engine block. In a refinement of this embodiment, contracting the outer diameter of the cylinder liner includes placing the cylinder liner in cooling device before inserting the cylinder liner into the cylinder cavity. In another refinement, securing the cylinder liner includes expanding the outer diameter of the cylinder liner into a press fit with the engine block in the cylinder cavity while the alignment tool aligns the aperture with the port.

In an embodiment, inserting the alignment tool includes inserting the alignment tool through the port in the cylinder block and then into the aperture of the cylinder liner. In an embodiment, inserting the alignment tool includes inserting the alignment tool through the cylinder liner, and then through the aperture and into the port in the cylinder block.

In an embodiment, inserting the cylinder liner into the cylinder cavity includes positioning an end of the cylinder liner in abutting engagement with a lip in the cylinder cavity to axially locate the cylinder liner in the cylinder cavity. In an embodiment, the method includes rotating the cylinder liner about a longitudinal axis of the cylinder liner using the alignment tool as the alignment tool is inserted through the aperture of the cylinder liner.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected.

It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. An internal combustion engine comprising:

an engine block with at least one cylinder cavity in the engine block, wherein the at least one cylinder cavity extends axially along a longitudinal axis, and the engine block includes at least one port that opens into the cylinder cavity; and a cylinder liner extending axially along the cylinder cavity and in contact with the engine block, the cylinder liner including a wall and at least one aperture that extends between an inner surface of the wall and an outer surface of the wall, wherein at the inner surface of the wall the at least one aperture is aligned with a projected opening of the at least one port, and at the outer surface of the wall the at least one aperture is offset outwardly from the opening of the at least one port into the cylinder cavity.

2. The internal combustion engine of claim 1, wherein:

the engine block includes a plurality of ports positioned circumferentially around the cylinder cavity, and each of the plurality of ports opens into the cylinder cavity; and the cylinder liner includes a plurality of apertures, and at the inner surface of the wall each of the plurality of apertures is aligned with a projection of the opening of a respective one of the plurality of ports.

3. The internal combustion engine of claim 1, wherein:

the engine block includes at least one intake port at a first axial location along the cylinder cavity and at least one exhaust port at a second axial location along the cylinder cavity; and the cylinder liner includes a first cylinder liner with at least one aperture aligned with the at least one intake port and a second cylinder liner with at least one aperture aligned with the at least one exhaust port.

4. The internal combustion engine of claim 3, further comprising a first piston axially movable along the first cylinder liner and a second piston axially movable along the second cylinder liner.

5. The internal combustion engine of claim 1, wherein the cylinder liner is contracted in size for insertion into the cylinder cavity and expands after insertion to press fit the outer surface of the wall into contact with the cylinder block.

6. The internal combustion engine of claim 1, wherein:

the engine block includes a lip in the at least one cylinder cavity; and the wall of the cylinder liner extends from a first end to an opposite second end, and the first end is in abutting contact with the lip.

7. The internal combustion engine of claim 1, wherein:

the at least one aperture of the cylinder liner is defined by:

a leading end surface;

an opposite trailing end surface spaced from the leading end surface; and opposite side surfaces extending axially along the longitudinal axis between the leading end surface and the trailing end surface;

the leading end surface and the trailing end surface are each offset along the longitudinal axis from the opening of the at least one port at the outer surface of the wall of the cylinder liner; and the opposite side surfaces each include a first portion aligned with the opening of the least one port at the outer surface of the wall of the cylinder liner and a second portion circumferentially offset from the opening of the at least one port at the outer surface of the wall of the cylinder liner.

8. A cylinder liner for an internal combustion engine, the liner comprising:

a cylindrical body including a first end, a second end opposite the first end, and a wall, the wall extending along a longitudinal axis from the first end to the opposite second end of the body, the wall having an inner surface and an outer surface; and at least one aperture extending between the inner surface and the outer surface, the at least one aperture being defined by a leading end surface and an opposite trailing end surface spaced from one another along the longitudinal axis, the at least one aperture further being defined by opposite side surfaces extending between the leading end surface and the trailing end surface, wherein at least one of the leading end surface and the trailing end surface is obliquely oriented to the inner surface and the outer surface of the wall.

9. The cylinder liner of claim 8, wherein each of the leading end surface, the trailing end surface, and the opposite side surfaces is obliquely oriented to the inner surface and the outer surface of the wall.

10. The cylinder liner of claim 8, wherein the opposite side surfaces are non-parallel to one another so that the at least one aperture is larger adjacent one of the leading end surface and the trailing end surface than the other of the leading end surface and the trailing end surface.

11. The cylinder liner of claim 8, wherein the at least one aperture includes a plurality of apertures circumferentially distributed about the wall of the cylinder liner.

12. The cylinder liner of claim 8, wherein the at least one aperture is located closer to one of the first end and second end of the body of the cylinder liner than the other of the first end and second end of the body.

13. A method for installing a cylinder liner in an internal combustion engine having an engine block with a cylinder cavity, the method comprising:

inserting the cylinder liner into the cylinder cavity to initially align an aperture in a wall of the cylinder liner with a port in the cylinder block;

inserting an alignment tool through the aperture of the cylinder liner to finally align the aperture and the port; and securing the cylinder liner in the cylinder cavity to the engine block while the aperture of the cylinder liner is finally aligned with the port of the engine block.

14. The method of claim 13, further comprising contracting an outer diameter of the cylinder liner before inserting the cylinder liner into the cylinder cavity of the engine block.

15. The method of claim 14, wherein contracting the outer diameter of the cylinder liner includes placing the cylinder liner in cooling device before inserting the cylinder liner into the cylinder cavity.

16. The method of claim 14, wherein securing the cylinder liner includes expanding the outer diameter of the cylinder liner into a press fit with the engine block in the cylinder cavity while the alignment tool aligns the aperture with the port.

17. The method of claim 13, wherein inserting the alignment tool includes inserting the alignment tool through the port in the cylinder block and then into the aperture of the cylinder liner.

18. The method of claim 13, wherein inserting the alignment tool includes inserting the alignment tool through the cylinder liner, and then through the aperture and into the port in the cylinder block.

19. The method of claim 13, wherein inserting the cylinder liner into the cylinder cavity includes positioning an end of the cylinder liner in abutting engagement with a lip in the cylinder cavity to axially locate the cylinder liner in the cylinder cavity.

20. The method of claim 13, further comprising rotating the cylinder liner about a longitudinal axis of the cylinder liner using the alignment tool as the alignment tool is inserted through the aperture of the cylinder liner.

* * * * *